(12) United States Patent
Nakagawa

(10) Patent No.: US 8,471,800 B2
(45) Date of Patent: *Jun. 25, 2013

(54) DISPLAY DEVICE, LIQUID CRYSTAL DISPLAY DEVICE, AND METHOD FOR MANUFACTURING DISPLAY DEVICE

(75) Inventor: Hidetoshi Nakagawa, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,755

(22) Filed: Sep. 6, 2012

(65) Prior Publication Data

US 2012/0326953 A1    Dec. 27, 2012

Related U.S. Application Data

(63) Continuation of application No. 13/398,868, filed on Feb. 17, 2012, now Pat. No. 8,284,141, which is a continuation of application No. 13/231,026, filed on Sep. 13, 2011, now Pat. No. 8,144,097, which is a continuation of application No. 11/993,263, filed as application No. PCT/JP2006/315061 on Jul. 28, 2006, now Pat. No. 8,040,308.

(30) Foreign Application Priority Data

Aug. 12, 2005 (JP) .................................. 2005-235066

(51) Int. Cl.
*G09G 3/36* (2006.01)

(52) U.S. Cl.
USPC ............................................... 345/90; 349/54

(58) Field of Classification Search
USPC ........................................................... 345/90
See application file for complete search history.

(56) References Cited

U.S. PATENT DOCUMENTS 8,284,141 B2 * 10/2012 Nakagawa ...................... 345/90

OTHER PUBLICATIONS

Nakagawa; "Display Device, Liquid Crystal Display Device, and Method for Manufacturing Display Device"; U.S. Appl. No. 11/993,263; filed Dec. 20, 2007.
Nakagawa; "Display Device, Liquid Crystal Display Device, and Method for Manufacturing Display Device"; U.S. Appl. No. 13/231,026; filed Sep. 13, 2011.
Nakagawa; "Display Device, Liquid Crystal Display Device, and Method for Manufacturing Display Device"; U.S. Appl. No. 13/398,868; filed Feb. 17, 2012.

* cited by examiner

*Primary Examiner* — Alexander Eisen
*Assistant Examiner* — Kenneth B Lee, Jr.
(74) *Attorney, Agent, or Firm* — Keating & Bennett, LLP

(57) ABSTRACT

A display device displays images with a plurality of signal lines and includes spare lines, each being arranged to be connectable to the signal lines so as to be used for recovery of the signal lines from disconnection. Each of the spare lines has constricted sections for cutting. With this arrangement, it is possible to easily and properly recover the signal lines from disconnection.

11 Claims, 8 Drawing Sheets

DISPLAY DEVICE, LIQUID CRYSTAL DISPLAY DEVICE, AND METHOD FOR MANUFACTURING DISPLAY DEVICE

BACKGROUND OF THE INVENTION

1. Field of the Invention

The present invention relates to spare lines for recovery from disconnection and a common line for the prevention of excess current, both of which are provided in a display device.

2. Description of the Related Art

Active-matrix liquid crystal display devices, for instance, have a plurality of data signal lines and scanning signal lines arranged in a matrix pattern, together with thin-film transistors and pixel electrodes connected to the transistors in the vicinity of intersection points of the data signal lines and the scanning signal lines. Display screen images are displayed by changing the status of orientation of liquid crystal upon feeding signal potential to the pixel electrodes through the data signal lines under on/off control of the thin-film transistors through the scanning signal lines.

Recently, in response to a need for better quality of display images, the width of the data signal lines has become extremely narrow, namely, less than 10 μm, and in actual instance, 6 μm. As a result, breaks tend to occur in a manufacturing process. For instance, dust getting in during film formation and only a pinhole appearing on a resist mask during etching result in breaks. Such breaks in the data signal lines cause black lines in normally black mode or bright lines in normally white mode on a screen because proper signal potential cannot be fed to the pixel electrodes located behind the breaks. Thus, a critical defect in the quality of display images arises.

As a solution for recovery from such disconnection, the following method has been suggested. That is to say, spare lines are provided so as to extend from the vicinity of the signal input-side ends of data signal lines toward the vicinity of the opposite ends (i.e., below a display area), passing through an external substrate of a panel. The end of a line part behind a break in the data signal line is connected to the spare line by laser melting, so that signals can be supplied to the line part behind the break. According to the method above, the spare lines are formed in advance in a pattern as illustrated in FIG. 7 below the display area (i.e. in a lower area of the panel), so that the broken data signal line is connected to one of the spare lines for recovery from defects.

With regard especially to large-size display devices such as televisions and monitors, a spare line is wide, and a line part behind a connection point (an unnecessary line part) is long. This increases a load on the unnecessary line part. Therefore, as illustrated in FIG. 8, the unnecessary line parts (shaded portions in the figure) have to be removed.

However, a wide spare line is not easy to cut by laser cutting, for instance. This gives rise to the problem that cutting is laborious or proper cutting is impossible.

SUMMARY OF INVENTION

In order to solve the problems above, preferred embodiments of the present invention provide a display device which enables a signal line recover from disconnection easily and properly.

In order to solve the problems above, a display device according to a preferred embodiment of the present invention which displays images with a plurality of signal lines, includes: spare lines each being arranged to be connectable to the signal lines directly or via a line or the like so as to be used for recovery of the signal lines from disconnection, wherein each of the spare lines has constricted sections for cutting. The signal lines may be any lines as long as they are communication paths of a display device, such as data signal lines.

According to the arrangement described above, when a signal line has a break, for instance, a signal input-side end and the other end (end point) of the signal line, which other end is behind the break in relation to the signal input side, can be connected (by melting, for instance) to the spare line. This enables signals to be supplied to a line part behind the break in the signal line via the spare line. In the arrangement above, the spare line has the constricted sections for cutting. That is to say, by cutting the spare line at its constricted section, it is possible to easily remove a portion (a portion of the signal line and a portion behind a connection point of the signal line and a relay line) which is irrelevant to signal transfer through the spare line. Thus, it is possible to recover an unusable line portion behind the break in relation to the side of signal input, accordingly solve display defects due to the break, and save a lot of trouble during the recovery. The constricted sections are preferably formed in the vicinity of the end opposite to the signal input-side end of the signal lines.

The display device according to a preferred embodiment of the present invention may further include relay lines each intersecting a predetermined number of the signal lines and intersecting any of the spare lines. According to the arrangement above, the relay lines are provided between the spare lines and the signal lines. This makes it possible to reduce intersection points of the spare lines and the signal lines, thus reduce adverse effect such as parasitic capacitance.

According to the arrangement above, in case there is a broken signal line, a predetermined relay line is connected to the signal line and a spare line. The spare line is cut at its constricted section which is located behind a connection point of the spare line and the relay line. By providing the constricted section in the vicinity of (or preferably right behind) the connection point, more unnecessary line portions (portions irrelevant to signal transfer through the spare line) can be removed. Thus, an unusable line portion behind a break in relation to the side of signal input is recovered.

The display device according to a preferred embodiment of the present invention may be arranged such that the constricted sections are located between groups of one relay line or a predetermined number of relay lines.

This makes it possible to make the intersecting (directly connectable) point of the spare line and the relay line close to the constricted section. Thus, it is possible to accurately recover a line portion behind a break (an unusable line portion) from disconnection by cutting more unnecessary line portion (a portion irrelevant to signal transfer through the spare line) off.

In order to solve the problems above, the display device according to a preferred embodiment of the present invention which displays images with a plurality of signal lines, includes a common line to which an excess current flowing in the signal lines is let out, the common line having constricted sections for cutting.

According to the structure above, in case of a short-circuit in a signal line and a common line for some reason, it is possible to easily cut the common line at its constricted section. Thus, it is possible to reduce the load of the common line on the short-circuited signal line and also save trouble during the cutting.

The display device according to a preferred embodiment of the present invention is a display device having a display section in which a plurality of data signal lines is provided, includes a plurality of spare lines, provided around the display section, being used for recovery of the data signal line from disconnection, wherein a plurality of constricted sections is formed at an interval on each of the spare lines along an edge opposite to a data input side edge of the display section.

According to the arrangement above, when disconnection occurs in a data signal line, an end of the data signal line is connected to a spare line directly or via a line, and the spare line is cut at its constricted section behind the connection point in relation to the side of signal input. Thus, it is possible to recover the data signal line from disconnection, to reduce a load resulting from a portion that is irrelevant to signal transfer, and to save trouble during the recovery.

The display device is preferably such that a relay line is arranged so as to extend between two adjacent constricted sections toward an end of the data signal line.

The display device may be arranged such that: at least one of the spare lines is connected to the relay line by melting; the spare line is cut at its constricted section that is immediately behind a connection point by melting in relation to a signal input side; and the relay line is connected to a broken data signal line by melting.

A liquid crystal display device according to another preferred embodiment of the present invention includes the above display device.

In order to solve the problems above, a method for manufacturing a display device according to yet another preferred embodiment of the present invention includes the steps of: forming a spare line that is arranged to be connectable to the signal line directly or via a relay line so as to be used for recovery of the signal line from disconnection, and forming a constricted section on the spare line at a position behind a connectable point with the signal line or the relay line; checking whether there is a broken signal line or not; and in a case where there is a broken signal line, connecting the broken signal line to the spare line, and cutting the spare line at the constricted section.

As described above, according to the display device, when a signal line has a break, for instance, a signal input-side end and the other end (end point) of the signal line, which other end is behind the break in relation to the signal input side, are connected to the spare line. This enables signals (signal potential) to be supplied to a line portion behind the break in the signal line via the spare line. In the arrangement above, the spare line has the constricted sections for cutting. That is to say, by cutting the spare line at its constricted section, it is possible to significantly easily remove a portion which is irrelevant (an unnecessary line part) to signal transfer through the spare line. Thus, it is possible to easily and properly recover the signal lines from disconnection.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

The following will describe preferred embodiments of the present invention with reference to FIGS. 1 to 6.

Figure 2:
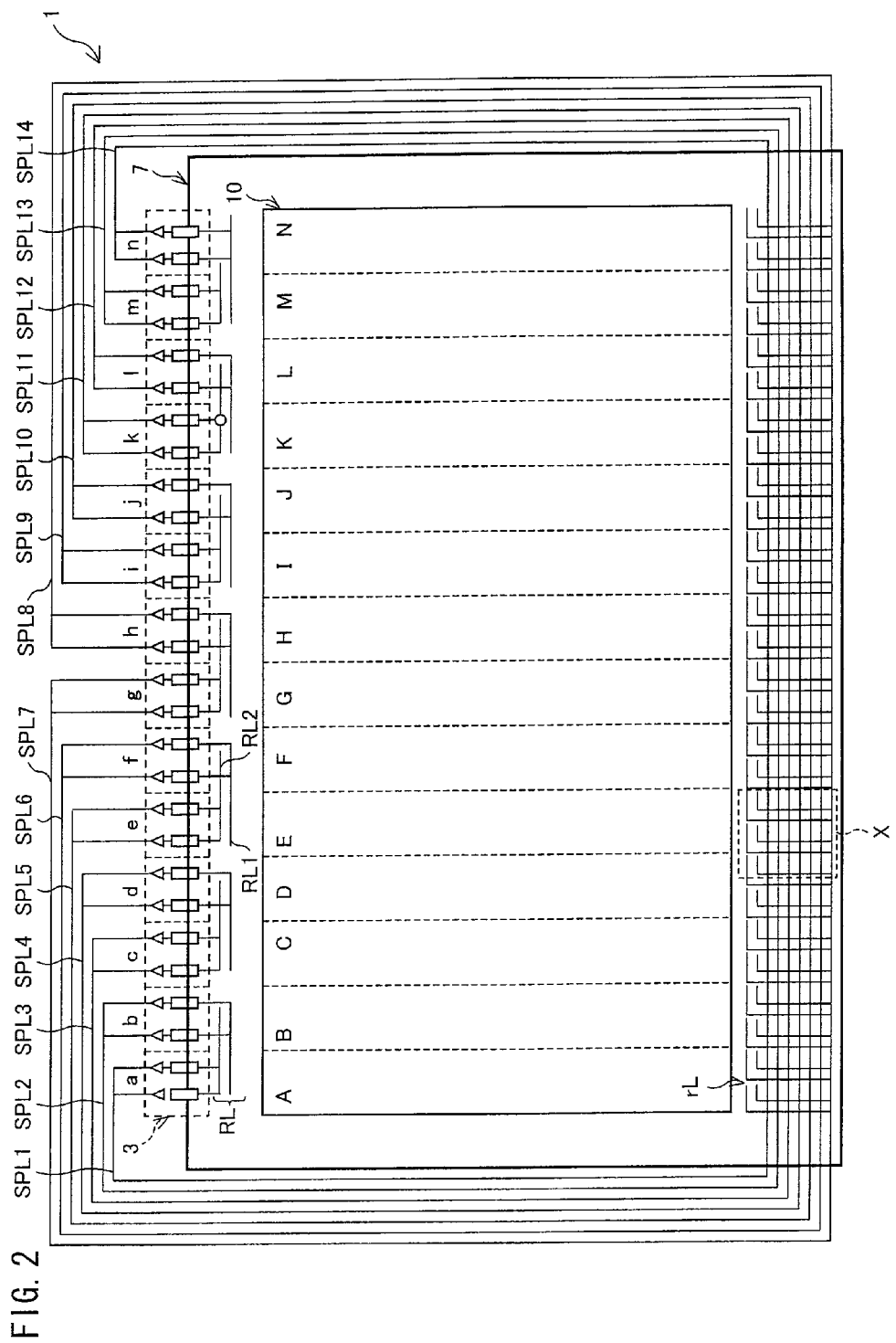
FIG. 2 is a plan view of the arrangement (before recovery from defects) of a display device according to a preferred embodiment of the present invention.
Figure 3:
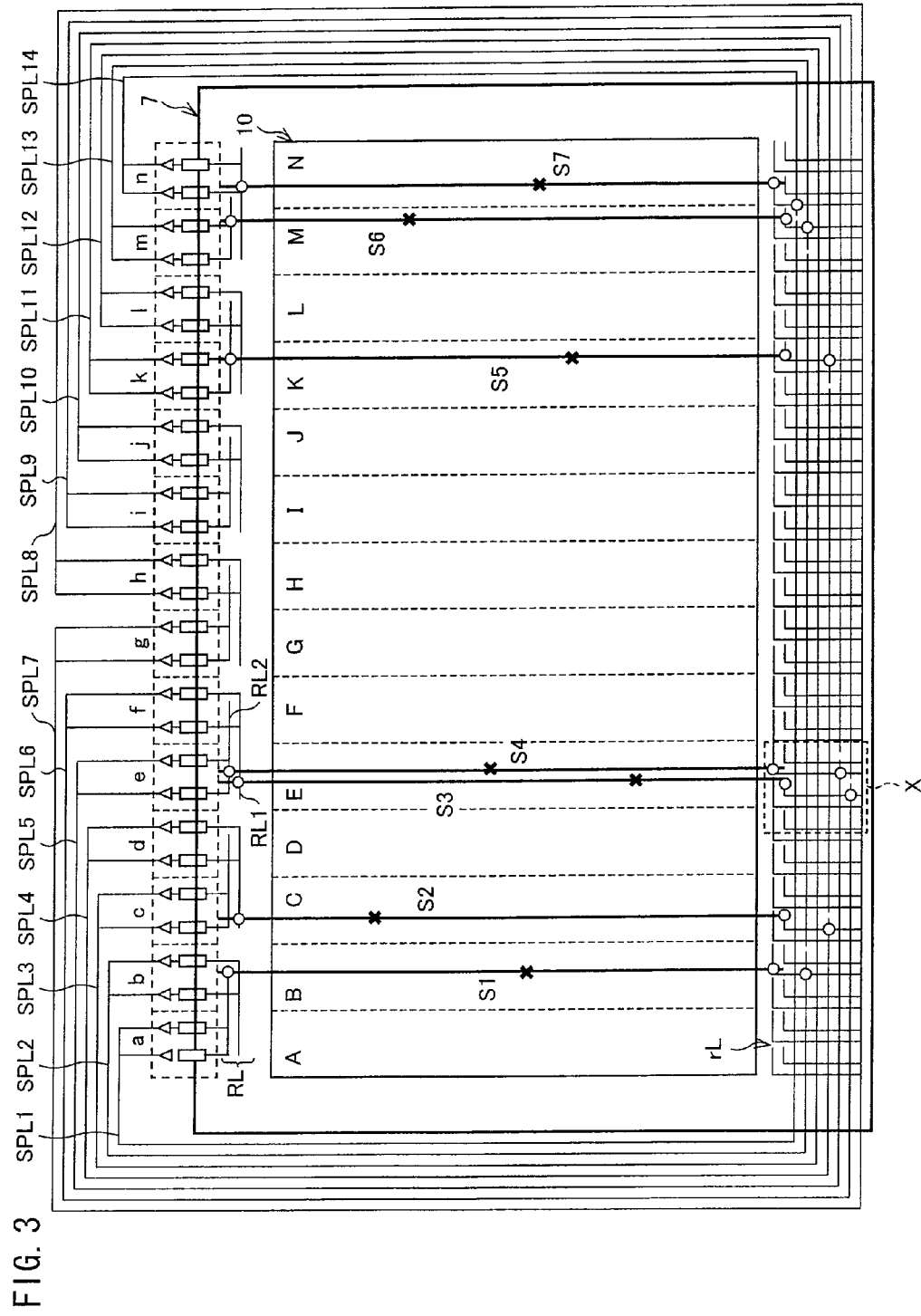
FIG. 3 is a plan view of the arrangement (after recovery from defects) of a display device according to a preferred embodiment of the present invention.

FIG. 2 illustrates the display device of the present preferred embodiment before the recovery of lines from disconnection. FIG. 3 illustrates the display device after the recovery of lines from disconnection. As illustrated in FIG. 2, the display device 1 includes a connection section 3, a panel 7, spare lines SPL1 to SPL14, input-side relay lines RL, and non-input-side relay lines rL. In the panel 7, a display area 10 is provided. In the display area 10, a plurality of data signal lines is arranged vertically in the figure; a plurality of scanning signal lines is arranged horizontally in the figure. In the vicinity of intersection points of the data signal lines and the scanning signal lines, thin-film transistors and pixel electrodes are provided. However, these components are omitted in FIGS. 2 and 3. In FIG. 3, only data signal lines S1 to S7 with breaks are illustrated (In FIG. 3, a symbol x represents a break). Data signals are sent through normal data signal lines without breaks downwards (i.e., from a data signal input side to a non-data-signal-input side) in the figure. Scanning signals are sent through the scanning signal lines from left to right or from right to left in the figure. The display area 10 is divided into 14 display blocks A through N. Each of the display blocks has a predetermined number (300 to 400) of data signal lines.

The connection section 3 is provided above the display area 10 (above the upper edge of the display area 10) and composed of connection blocks a through n respectively corresponding to the display blocks A through N. Each of the connection blocks is connected to data signal lines residing in a corresponding display block, and includes two adjacent circuits, each of which includes one terminal and one buffer connected to the terminal on the input side.

Each of the spare lines SPL1 through SPL14 has an end which is connected to the output of the buffer in the connection block. The spare lines SPL1 through SPL14 extend along the outer edges of the panel 7 (along the left outer edge of the panel 7 for SPL1 through SPL7 and along the right outer edge of the panel 7 for SPL 7 through 14) toward an area below the display area 10 in the panel 7 (i.e., an area outside the lower edge of the display area 10 and a lower area of the panel). In the area below the display area 10, the spare lines SPL1 through 14 extend in the direction along the scanning lines. For instance, a spare line SPL2 has an end which is connected to the outputs of buffers in a connection block b. The spare line SPL2 extends along the left outer edge of the panel 7 toward the area below the display area 10 in the panel 7. In the area below the display area 10, the spare line SPL2 extends in the direction along the scanning lines. Similarly, a spare line SPL13 has an end which is connected to the outputs of buffers in a connection block m. The spare line SPL13 extends along the right outer edge of the panel 7 toward the area below the display area 10 in the panel 7. In the area below the display area 10, the spare line SPL13 extends in the direction along the scanning lines. Before recovery from disconnection (FIG. 2), two spare lines (pair of SPL1 and SPL14, pair of SPL2 and SPL13 . . . ) coming from the both sides of the panel 7 are connected to each other inside the area below the display area 10.

What is notable here is that each of the spare lines (SPL1 through SPL14) has constricted sections (narrow sections) to be cut for repairing disconnections in the area below the display area 10 (i.e., the vicinity of the opposite side of signal input of the data signal lines).

Input-side relay lines RL are provided between the display area 10 and the connection section 3. That is to say, two input-side relay lines RL extending in the direction along scanning lines are arranged in parallel between adjacent two display blocks and two connection blocks corresponding to the display blocks. One input-side relay line is connected to terminals in one connection block; the other input-side relay line is connected to terminals in the other connection block. With this arrangement, it is possible to recover two data signal lines of the data signal lines residing in two display blocks from the disconnection. That is to say, it is possible to recover a maximum of 14 data signal lines in total from disconnection. Note that it is possible to recover two data signal lines in one display block from disconnection. For instance, two input-side relay lines RL1 and RL2 extending in the direction along scanning lines are provided in parallel between adjacent two display blocks E and F and two connection blocks e and f. The input-side relay line RL1 is connected to terminals in the connection block e; the input-side relay line RL2 is connected to terminals in the connection block f.

As illustrated in FIG. 2, non-input-side relay lines are provided below the display blocks A through N (i.e., below the lower edges of the display blocks). Each of the non-input-side relay lines preferably has the shape of a reverse 'L.' More specifically, one line portion of the non-input-side relay line extends in the direction along the data signal lines, and the other line portion faces the display blocks. The line portion extending along the data signal lines is shorter than the other line portion facing the display blocks although the non-input-side relay lines are deformed in FIGS. 2, 1, 4, and other drawings. In FIG. 2, two large non-input-side relay lines and two small non-input-side relay lines are arranged in the direction in which scanning lines extend, such that the large one and the small one are arranged alternately. However, the present preferred embodiment is not limited to this arrangement. Alternatively, four large non-input-side relay lines and four small non-input-side relay lines may be arranged in the direction in which the scanning lines extend, such that the large one and the small one are arranged alternately.

Figure 4:
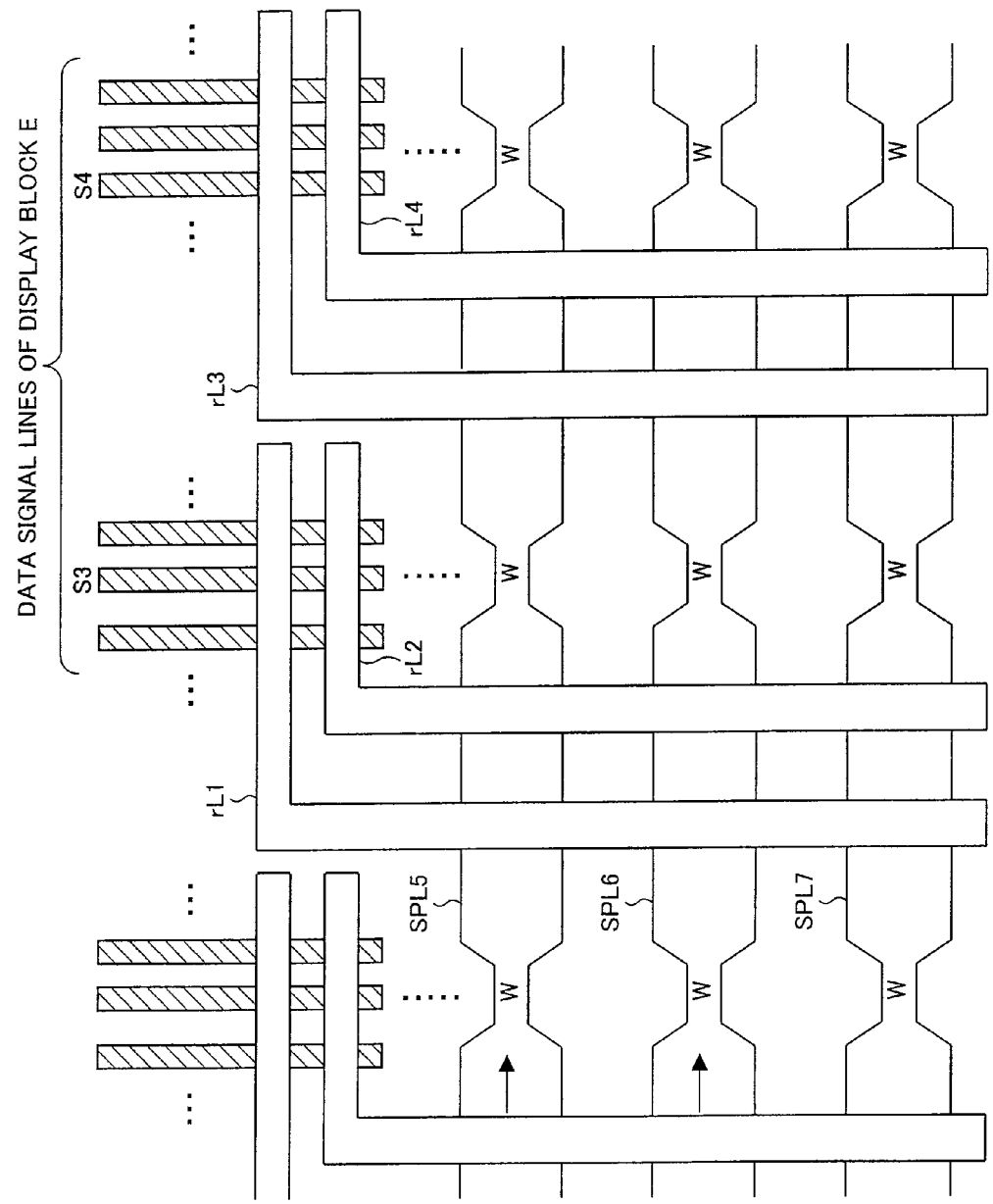
FIG. 4 is a plan view of the arrangement of the substantial portion (before recovery from defects) of a display device according to a preferred embodiment of the present invention.

FIG. 4 is an enlarged view of an area X illustrated in FIG. 2. As illustrated in the figure, non-input-side relay lines rL1 through rL4 each of which preferably has the shape of a reverse 'L' are arranged below a display block E. The non-input-side relay lines rL1 through rL4 are arranged in order of the large non-input-side relay line rL1, the small non-input-side relay line rL2, the large non-input-side relay line rL3, and the small non-input-side relay line rL4 in the direction in which the scanning lines extend. As illustrated in FIG. 4, each of the data signal lines in the display block E intersects with a (longer) line portion of any of the non-input-side relay lines rL1 through rL4. The other (shorter) line portion of the non-input-side relay line (rL1, rL2, rL3, and rL4) intersects with the seven spare lines SPL1 through SPL7 (partially illustrated in FIG. 4) extending in the direction along the scanning lines, as illustrated in FIGS. 2 and 4. The constricted sections w of the spare lines SPL1 through SPL7 is formed between a non-input-side relay line rL4 corresponding to the block D and the non-input-side relay line rL1 corresponding to the block E, between the non-input-side relay line rL2 corresponding to the block E and the non-input-side relay line rL3 corresponding to the block E, and between the non-input-side relay line rL4 corresponding to the block E and a non-input-side relay line rL1 corresponding to the block F.

More specifically, in FIG. 2, the data signal lines in any of display blocks A through N intersect with any of four non-input-side relay lines corresponding to the display block. Each of the spare lines SPL1 through SPL7 intersects with four non-input-side relay lines corresponding to each of the display blocks A through G. Each of the spare lines SPL8 through SPL14 intersects with four non-input-side relay lines corresponding to each of the display blocks H through N. At a regular interval, the constricted sections of the spare lines SPL1 through SPL7 are formed between a second non-input-side relay line from the left corresponding to a display block and a third non-input-side relay line from the left corresponding to the display block, and between a fourth non-input-side relay line from the left corresponding to the display block and a first non-input-side relay line from the left corresponding to its adjacent display block (on the right). This arrangement makes the connection point of a spare line and a non-input-side relay line close to a constricted section. Thus, more unnecessary line portions (portions of a spare line irrelevant to signal transfer) can be removed.

Figure 1:
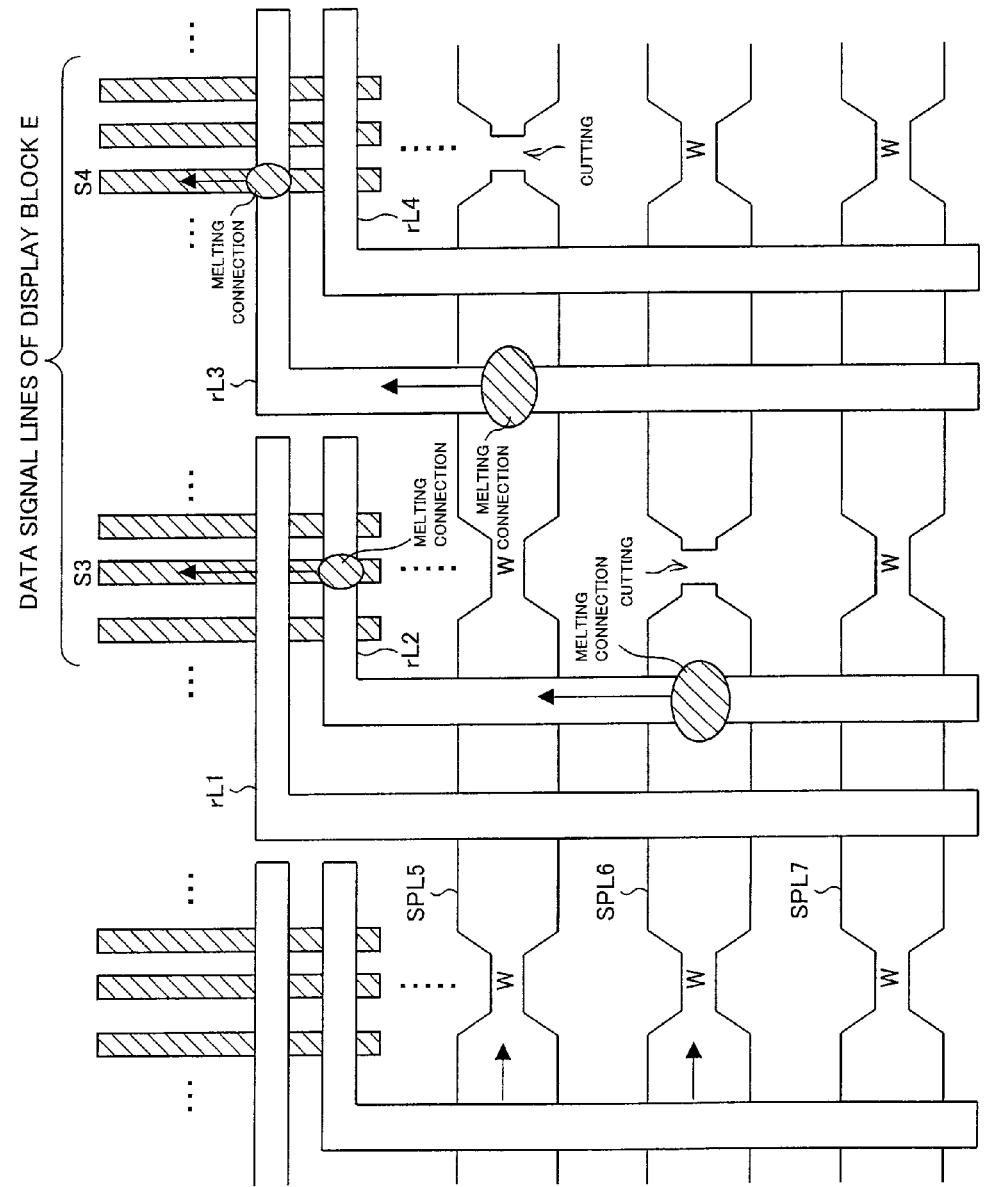
FIG. 1 is a plan view of the arrangement of the substantial portion (after recovery from defects) of a display device according to a preferred embodiment of the present invention.
Figure 5:
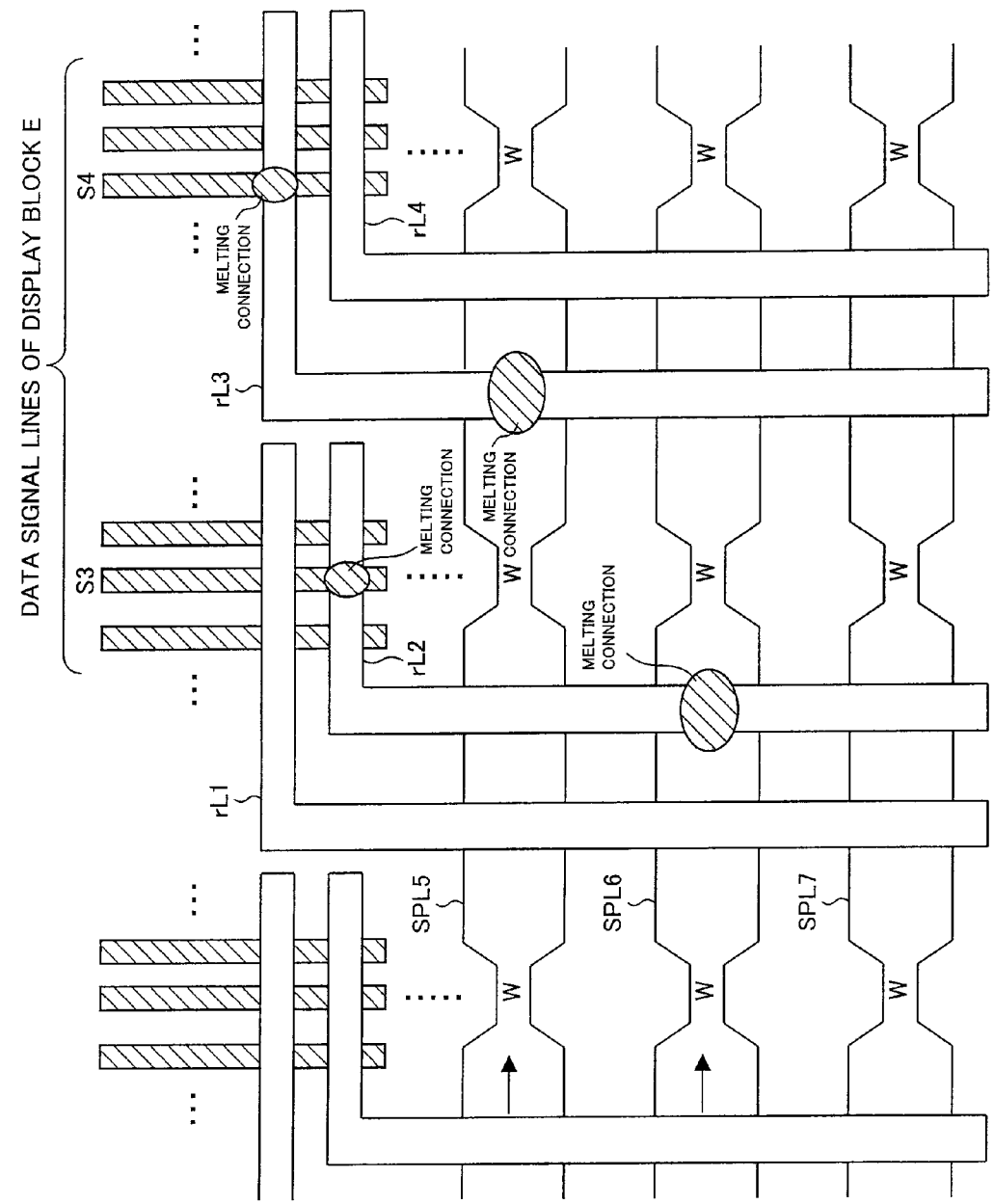
FIG. 5 is a plan view of the arrangement of the substantial portion (under recovery from defects) of a display device according to a preferred embodiment of the present invention.

Recovery of signal lines in a wiring pattern illustrated in FIG. 2 from disconnection is made as illustrated in FIGS. 3, 5, and 1. The following describes how to recover broken data signal lines S3 and S4, which is the same for other data signal lines. The line portion of the non-input-side relay line rL along the data signal lines is shorter than the other line portion although the line portions of the non-input-side relay line are deformed in FIGS. 1, 3, and 5.

First, a broken data signal line (data signal input-side end) and a spare line are connected through an input-side relay line RL in an area above the display area 10 (in an area above the upper edge of the display area 10). As for the broken data signal line S3, for instance, the signal line S3 and an input-side relay line RL1 are connected by laser melting. Similarly, as for the broken data signal line S4, the signal line S4 and an input-side relay line RL2 are connected by laser melting.

Second, a data signal non-input-side end (endpoint) of the broken data signal line and the spare line are connected through a non-input-side relay line rL in an area below the display area 10 (in an area below the lower edge of the display area 10). As for the broken data signal line S3, for instance, an end point of the data signal line S3 and the longer line portion of a non-input-side relay line rL2 are connected to each other by laser melting. The shorter line portion of the non-input-side relay line rL2 and a spare line SPL6 are also connected by laser melting. As for the broken data signal line S4, an end point of the data signal line S4 and the longer line portion of a non-input-side relay line rL3 are connected by laser melting. The shorter line portion of the non-input-side relay line rL3 and a spare line SPL5 are also connected by laser melting.

Third, the spare line connected to the broken signal line is cut at its constricted section via a laser. For instance, the spare SP6 connected to the broken data signal line S3 (through the non-input-side relay line rL2) is cut at its constricted section w which is located between the non-input-side relay line rL2 and the non-input-side relay line rL3. The spare line SPL5 connected to the broken data signal line S4 (through the non-input-side relay line rL3) is cut at its constricted section w which is located between a non-input-side relay line rL4 and a non-input-side relay line rL1 corresponding to a display block F.

The above-described processes enable a signal potential to be fed to a line portion behind the break in the data signal line S3 via the input-side relay line RL1 that is one of the input-side relay lines corresponding to the display blocks E and F, terminals and buffers of the connection block F, the spare line SPL6, and the non-input-side relay line rL2. Thus, display defects due to disconnection are solved. A signal potential is fed to a line portion behind the break in the data signal line S4 via the input-side relay line RL2 that is one of the input-side relay lines corresponding to the display blocks E and F, terminals and buffers in the connection block e, the spare line SPL5, and the non-input-side relay line rL3. Thus, display defects due to disconnection are solved.

Thus, according to various preferred embodiments of the present invention, it is possible to easily remove a portion of the spare line SPL which is irrelevant to signal transfer (a portion behind the connection point of a spare line and a relay line rL) by cutting the spare line SPL at its constricted section w. As a result, it is possible to accurately recover portions behind breaks in the data signal lines S1 through S7 from disconnection and save a lot of trouble during the recovery.

The present preferred embodiment has been described with reference to an arrangement in which the constricted sections are formed on the spare lines which are provided for recovery of signal lines from disconnection. However, the present preferred embodiment is not limited to this arrangement. Alternatively, the present preferred embodiment may include, for example, the arrangement as illustrated in FIG. 6, i.e., the arrangement in which constricted sections w for cutting are provided in a common line to which an excess current fed from the data signal lines through switching elements such as MOS transistors (Tr) is let out.

In the event of a short circuit (leakage) in a data signal line and a common line due to a foreign object and others, the quality of display images degrades because the load for the common line is applied to the data signal lines. In order to avoid this problem, the common line is cut. However, cutting a wide common line of a large display device or the like takes a lot of trouble.

Figure 6:
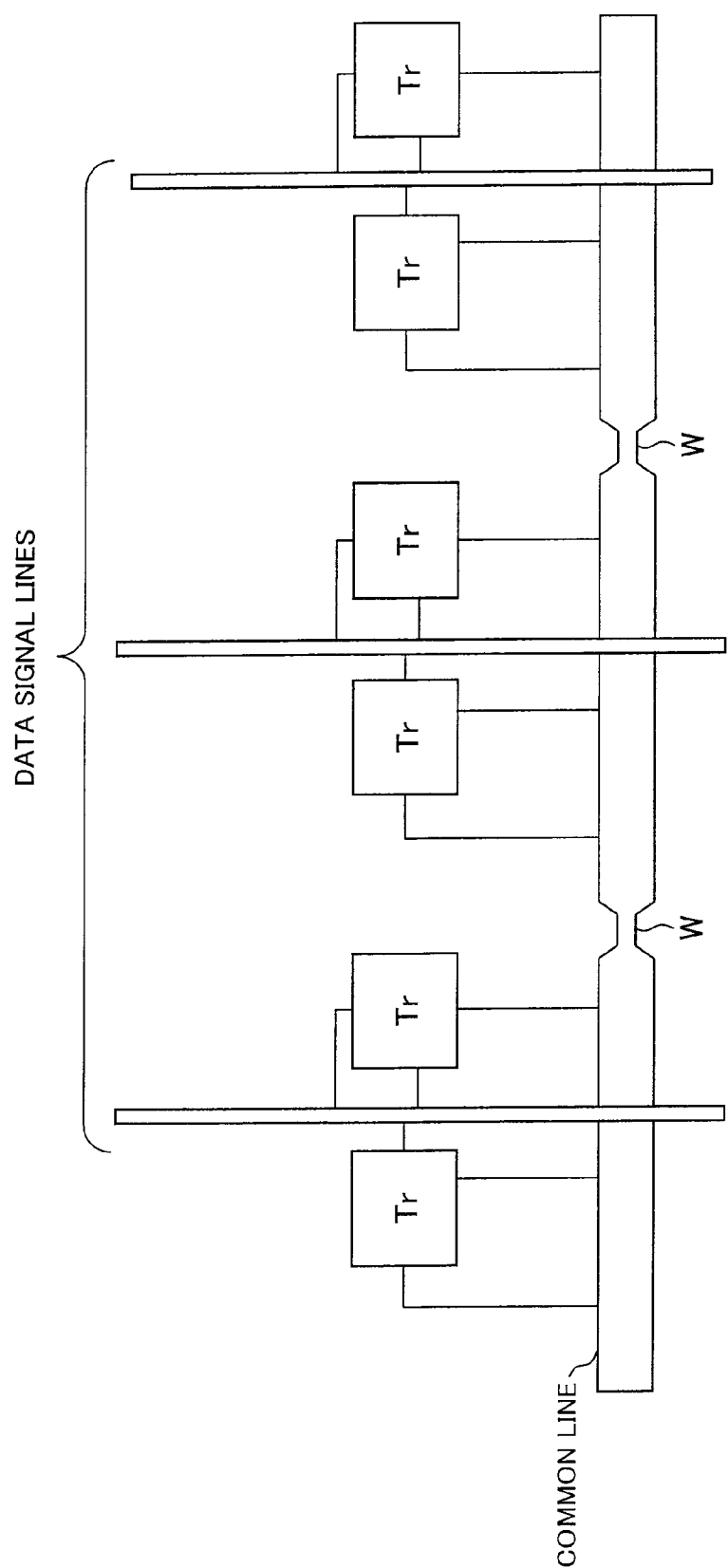
FIG. 6 is a plan view of the substantial portion of another display device according to a preferred embodiment of the present invention.
Figure 7:
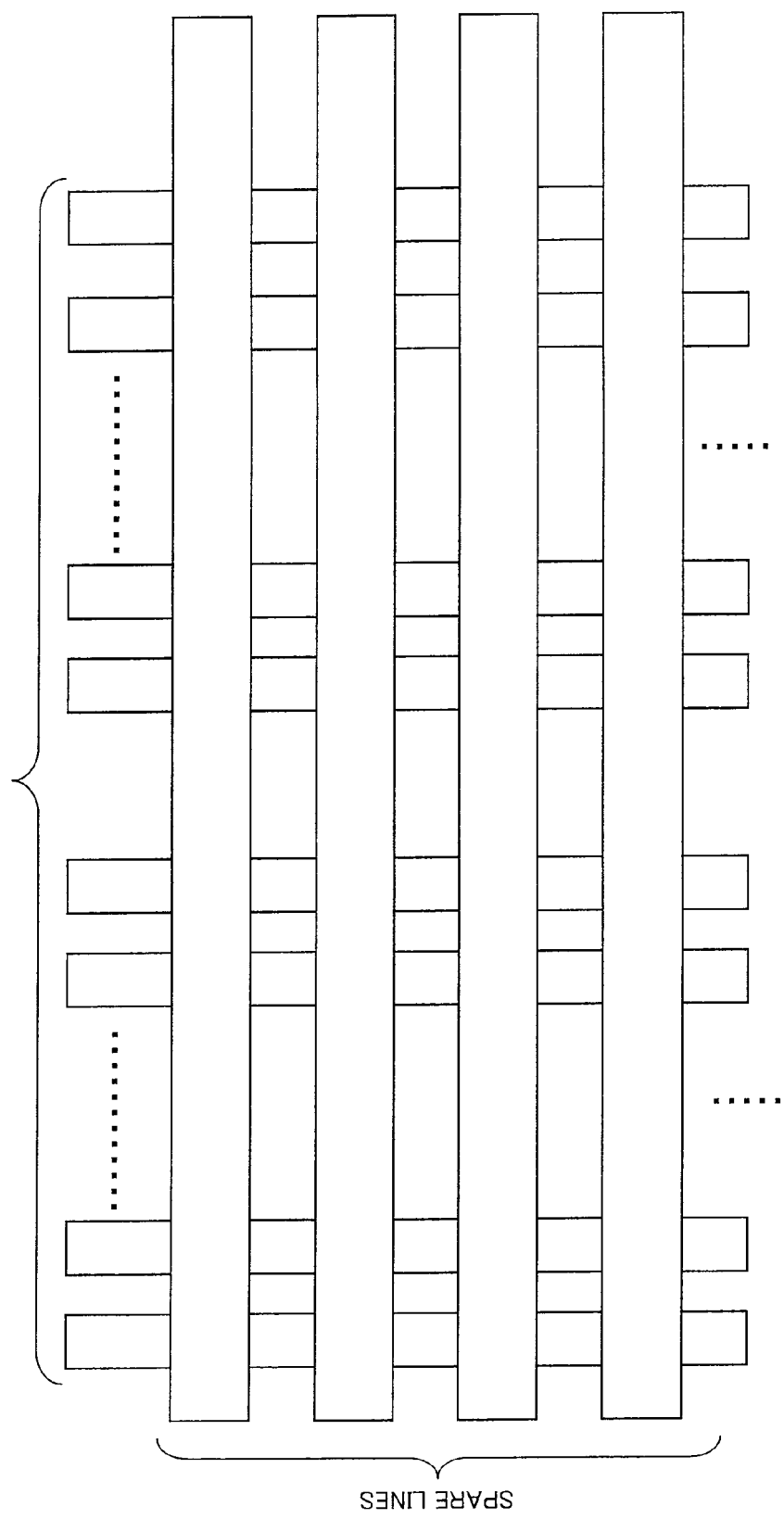
FIG. 7 is a plan view of the arrangement of the substantial portion (before recovery from defects) of a conventional display device.
Figure 8:
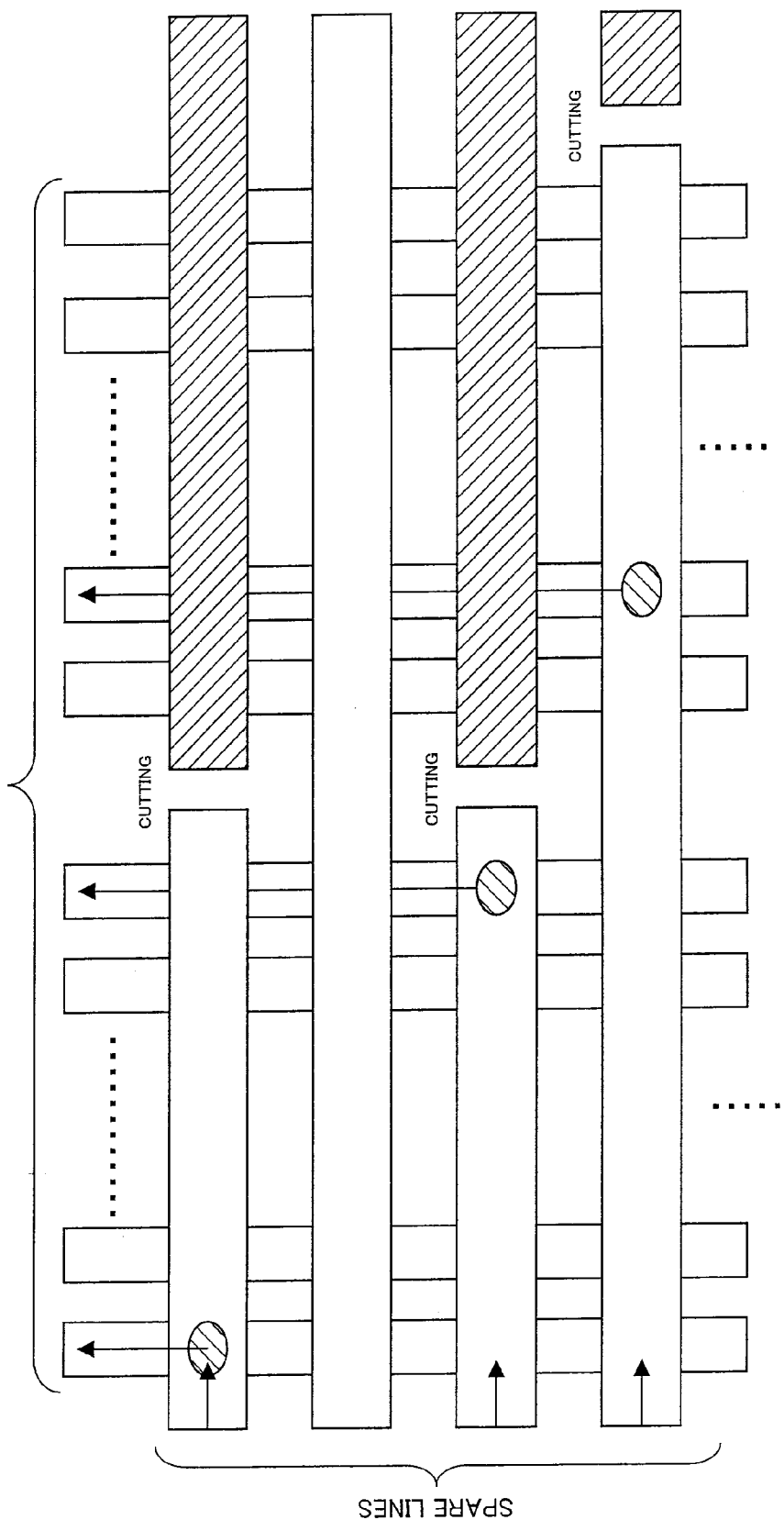
FIG. 8 is a plan view of the arrangement of the substantial portion (after recovery from defects) of the conventional display device.

In view of this, it is possible to accurately repair display defects due to the short circuit without a lot of trouble by cutting the common line at its constricted section w illustrated in FIG. 6.

The present invention is not limited to the description of the preferred embodiments above, but may be altered by a skilled person within the scope of the claims. A preferred embodiment based on a proper combination of technical means disclosed in different preferred embodiments described herein is encompassed in the technical scope of the present invention.

The display device according to various preferred embodiments of the present invention is suitably applicable to, for instance, large liquid crystal display televisions and a monitor.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A display device which displays images with a plurality of signal lines, comprising:
    a display area;
    a plurality of signal lines; and
    a common line including a plurality of narrower sections that are narrower than another portion of the common line, at least one of the plurality of narrower sections being arranged between two of the plurality of signal lines; wherein
    at least one of the plurality of narrower sections is arranged between two of the plurality of signal lines that are adjacent to each other among the plurality of signal lines outside of the display area.

2. The display device of claim 1, wherein each of the plurality of narrower sections includes a constricted section of the common line.

3. The display device of claim 1, wherein a sum of lengths of the plurality of narrower sections defines a minor portion of a length of the common line.

4. The display device of claim 1, wherein each of the plurality of narrower sections is arranged to be cut to recover from a short circuit between the common line and at least one of the plurality of signal lines.

5. The display device of claim 1, wherein the common line intersects with but not connects to at least one of the plurality of signal lines.

6. The display device of claim 1, further comprising:
    a first switching element located between at least one of the plurality of signal lines and the common line.

7. The display device of claim 6, wherein the first switching element is diode-connected transistor.

8. The display device of claim 6, further comprising:
    a second switching element located between at least one of the plurality of signal lines and the common line.

9. The display device of claim 8, wherein the second switching element is diode-connected transistor.

10. The display device of claim 1, wherein the common line at least partially overlaps at least one of the plurality of signal lines.

11. The display device of claim 1, wherein all of the plurality of narrower sections contained in the display device are arranged such that each respective one of the plurality of narrower sections is arranged between two corresponding signal lines of the plurality of signal lines.

* * * * *